United States Patent Office 2,735,850
Patented Feb. 21, 1956

2,735,850

PREPARATION OF GUANAMINES

William Owen Jones, London, England, assignor to The British Oxygen Company Limited, London, England No Drawing. Application February 18, 1954,
Serial No. 411,288

Claims priority, application Great Britain
February 18, 1953

8 Claims. (Cl. 260—249.9)

The present invention relates to the preparation of guanamines (2:4-diamino-1:3:5-triazines) from dicyandiamide.

It is known that guanamines may be prepared by reacting nitriles with dicyandiamide, that the reaction is catalysed by organic bases such as piperidine, pyrrolidine, di-(2-aminoethyl) amine and the like, and that an excess of nitrile may be used to serve as a reaction medium and to keep the dicyandiamide in solution.

It has further been proposed to react dicyandiamide with an organic nitrile in the presence of a strongly basic alkali metal compound, the reactants being mixed with a hydroxylated solvent. Whilst in this reaction high yields are obtainable, and a wide range of nitriles can be used, there are certain drawbacks in the operation of the process. In particular, the reactants are never completely dissolved, and the reaction mixture thickens during the course of reaction from a thin slurry to a thick porridge which is difficult to stir, and it is also therefore difficult to control the temperature on a large scale of operation, since the reaction is highly exothermic. Further, the crude reaction product has to be heavily diluted with water for the recovery of the guanamide, and for economic operation the hydroxylated solvent has to be recovered from this dilute solution.

It has further been proposed to convert dicyandiamide to a guanamine by reaction with an ammonium salt of an organic carboxylic acid in the presence of ammonium carbonate. This reaction is carried out at temperatures in the neighbourhood of the melting point of dicyandiamide, but the reacting mass is solid throughout the operation, and handling difficulties arise in consequence.

It is an object of the present invention to provide a process for the manufacture of guanamines which gives a high yield of product but is free from the disadvantages of the processes previously proposed.

According to the present invention, a process for the preparation of a guanamine comprises reacting dicyandiamide with a nitrile or polynitrile in liquid ammonia in the presence of a catalyst consisting of an alkali metal or an alkaline earth metal or an alkali metal hydroxide or amide or other strongly basic alkali metal compound at a temperature between 0° and 120° C. The reaction can be carried out at any temperature between 0° C. and 120° C. but the preferred reaction temperature is between 60° and 100° C. As the vapour pressure of the reaction mixture at these temperatures is above atmospheric pressure, the reaction must necessarily be carried out in a closed vessel. Examples of suitable catalysts include sodium, potassium, calcium, sodium and potassium hydroxides, sodium and potassium carbonates, sodamide, sodium methoxide, but the invention is not limited to the use of these particular compounds.

This preferred range of reaction temperature is substantially below that of other processes, and the liquid ammonia in addition to acting as solvent serves as a heat buffer to assist in controlling the heat liberated by the reaction. Further, the solvent can be readily distilled off during or at the end of reaction before the solid guanamine is treated with water for purification purposes.

Dicyandiamide is highly soluble in liquid ammonia, the solubility being 126 g. of dicyandiamide in 100 g. of liquid ammonia at 25° C. and 160 g. per 100 g. at 42.5° C. The nitriles are also generally completely miscible with or freely soluble in liquid ammonia.

The reaction between dicyandiamide and nitriles is exothermic and in the case of benzonitrile the heat involved amounts to 34.9 kcal. per mole. This heat can be taken up in a number of ways. It is possible if desired to use an appreciable amount of liquid ammonia, such as up to twice the weight of dicyandiamide used, and much of the heat of reaction is taken up in raising the temperature of this ammonia. Alternatively it is possible to use less ammonia, say a weight equal to that of the dicyandiamide used or half the weight of the dicyandiamide used; the heat of reaction evaporates some of the ammonia; the ammonia vapour is condensed and returned to the reacting mixture. In this way the cooling medium in the condenser serves to remove the heat of reaction. This procedure may be combined with removal of some of the ammonia as vapour from the system without returning the condensed liquid, so that at the end of the reaction only a solid product remains in the reactor.

The mechanism of the condensation is not fully understood. It is well known that sodium dissolves as such in liquid ammonia to give a blue solution, and that reaction between the sodium and the ammonia to give sodamide needs the presence of a catalyst, such as iron powder. If a solution of sodium in liquid ammonia is treated with a solution of dicyandiamide in liquid ammonia, the blue colour is discharged, and hydrogen is liberated, indicating the formation of sodium dicyandiamide. After reaction with a nitrile, probably to form in the first place a sodium derivative of the guanamine, the sodium ion may be liberated to re-form fresh sodium dicyandiamide. The amount of sodium required is therefore limited, but for high conversions in comparatively short reaction times it is preferred to use between 5 and 10% of the amount of sodium which will be equivalent to the dicyandiamide taken. When using an alkali metal hydroxide, which is not freely soluble in the liquid ammonia, it is preferred to use between 8% and 17% of the amount of sodium hydroxide which is equivalent to the dicyandiamide, i. e. 4–8% by weight of the dicyandiamide. The optimum amount of catalyst to be taken also depends on the chemical nature of the nitrile, on the relative amount of ammonia used, on the temperature and other conditions of reaction, and on the length of time for which the reaction is allowed to proceed, and the invention is not limited to the amounts of catalyst mentioned above. Preferably the molecular ratio of dicyandiamide to nitrile lies within the range 1.05–1.25.

Reaction can be carried out in any suitable pressure vessel. The pressure reached during the reaction depends on the temperature of operation, and unless ammonia is removed from the system during the course of reaction, the pressure rises appreciably during the reaction even if the temperature is maintained constant. This is due to the fact that dicyandiamide is very soluble in liquid ammonia and reduces its vapour pressure, whereas the guanamines are much less soluble, and the pressure of the system approaches that exerted by liquid ammonia alone at the temperature concerned. Although the solution of dicyandiamide in liquid ammonia is appreciably corrosive to mild steel, the reaction can be carried out in a mild steel vessel. It is, nevertheless, preferred to carry out the operation in an austenitic stainless steel vessel, which resists the corrosive action of dicyandiamide in liquid ammonia, and gives products notably free from metallic contamination.

The invention is illustrated by the following examples in which all parts are parts by weight.

*Example 1*

In a pressure vessel constructed of 18/18/1 austenitic steel, fitted with a stirrer, were placed benzonitrile (103 parts), dicyandiamide (98 parts) and sodium (4 parts). The vessel was purged with nitrogen, and liquid ammonia (172 parts) was fed in giving a pressure of 9 atm. The vessel was heated over 2¾ hours to 87° C. and maintained at 85–90° C. for a further one hour. The maximum pressure reached during this time was 43 atm. After cooling, the ammonia was distilled off and recovered, and the solid benzoguanamine was readily removed from the vessel. To remove alkali and excess dicyandiamide it was stirred with dilute acetic acid (700 parts of 1.5% acid) filtered and washed. On drying, 161 parts of pure benzoguanamine were obtained as a white powder, M. P. 227° C.; the yield was 86% on the benzonitrile.

*Example 2*

In a 20 litre mild steel pressure vessel were placed benzonitrile (2,947 parts), dicyandiamide (2,805 parts) and flake caustic soda (200 parts). The vessel was then bolted up, purged with nitrogen and liquid ammonia (2,800 parts) fed in. The mixture was stirred and heated slowly to 85–90° C. The pressure rose to 45 atm. After one hour, the ammonia was distilled off and the product (6,100 parts) removed as a white powder containing 86% of benzoguanamine. Excess dicyandiamide and caustic soda were removed from the product by stirring with water (21,100 parts), adding acetic acid until the pH of the mixture was 6.5–7.0, filtering, washing and drying. The dried product (5,240 parts, being 98% of the theoretical yield on benzonitrile) had a melting point of 225–227° C.

*Example 3*

In the alloy steel pressure vessel of Example 1 were placed benzonitrile (103 parts), dicyandiamide (98 parts) and caustic soda (7 parts). The vessel was purged with nitrogen and liquid ammonia (172 parts by volume) fed in. The vessel was heated to 60° C. and maintained there for four hours. The maximum pressure reached was about 20 atm. The ammonia was distilled off and the product worked up by washing as in Example 1. The yield of benzoguanamine was 178 parts (95% of theory on benzonitrile), M. P. 226–227° C.

*Example 4*

In the alloy steel pressure vessel of Example 1 were placed benzonitrile (103 parts), dicyandiamide (84 parts) and potassium carbonate (36 parts). The vessel was purged with nitrogen and liquid ammonia (98 parts) fed in. The vessel was heated to 90° C. over two hours and maintained there for a further hour. The maximum pressure reached was 35 atm. The ammonia was distilled off and on cooling and opening up the vessel, the product (214 parts) was readily discharged as a friable white powder. Washing and neutralisation with acetic acid as in Example 1 gave 142 parts of benzoguanamine M. P. 225–227° C.

*Example 5*

In the alloy steel pressure vessel of Example 1 were placed phenylacetonitrile (benzyl cyanide) (158 parts), dicyandiamide (130 parts) and flake caustic soda (10.7 parts). The vessel was purged with nitrogen, and liquid ammonia (114 parts) fed in. The vessel was heated to 90° C. and maintained there for one hour. After distilling off the ammonia, there were removed from the vessel 290 parts of crude phenylacetoguanamine in the form of a white powder. The product was triturated with water (700 parts) and acetic acid (16 parts) added. On filtration and drying there were obtained 255 parts of phenylacetoguanamine, M. P. 244° C. The yield on phenylacetonitrile was 94%.

*Example 6*

In the alloy steel pressure vessel of Example 1 were placed acetonitrile (40.6 parts), dicyandiamide (98 parts), and caustic soda (7 parts). The vessel was purged with nitrogen and liquid ammonia (172 parts) fed in. The vessel was heated to 90° C. and maintained there for one hour. After distilling off the ammonia, there were removed from the autoclave 119 parts of crude acetoguanamine, which was purified by trituration with ice water and acetic acid, giving 65 parts of the purified material M. P. 277°–278° C.

*Example 7*

In the alloy steel pressure vessel of Example 1 were placed adipodinitrile (54.3 parts), dicyandiamide (98 parts) and sodium (8 parts). The vessel was purged with nitrogen, and liquid ammonia (129 parts) fed in. The vessel was heated to 90° C. and maintained there for one hour. After distilling off the ammonia the product was washed with water and acetic acid giving 92 parts of 4-cyanovaleroguanamine, M. P. 254–257° C., representing a 95% yield on adiponitrile fed.

I claim:

1. Process for the preparation of a guanamine comprising reacting dicyandiamide with a substance chosen from the group consisting of lower alkyl aliphatic and aromatic hydrocarbon nitriles and dinitriles in liquid ammonia in the presence of a catalyst chosen from the group consisting of alkali metals, alkaline earth metals, alkali metal hydroxides and amides and other strongly basic alkali metal compounds, at a temperature between 0° C. and 120° C.

2. Process for the preparation of a guanamine comprising reacting dicyandiamide with a substance chosen from the group consisting of lower alkyl aliphatic and aromatic hydrocarbon nitriles and dinitriles in liquid ammonia in the presence of a catalyst chosen from the group consisting of alkali metals, alkaline earth metals, alkali metal hydroxides and amides and other strongly basic alkali metal compounds, at a temperature between 60° C. and 100° C.

3. Process for the preparation of a guanamine comprising reacting dicyandiamide with a substance chosen from the group consisting of lower alkyl aliphatic and aromatic hydrocarbon nitriles and dinitriles in liquid ammonia in the presence of sodium hydroxide in an amount of between 4% and 8% of the weight of dicyandiamide, at a temperature between 0° C. and 120° C.

4. Process for the preparation of a guanamine comprising reacting dicyandiamide with a substance chosen from the group consisting of lower alkyl aliphatic and aromatic hydrocarbon nitriles and dinitriles in liquid ammonia in the presence of sodium hydroxide in an amount of between 4% and 8% of the weight of dicyandiamide, at a temperature between 60° C. and 100° C.

5. Process for the preparation of a guanamine comprising reacting dicyandiamide with a substance chosen from the group consisting of lower alkyl aliphatic and aromatic hydrocarbon nitriles and dinitriles, the molecular ratio of dicyandiamide to said substance being between 1.05:1 and 1.25:1, in liquid ammonia in the presence of a catalyst chosen from the group consisting of alkali metals, alkaline earth metals, alkali metal hydroxides and amides and other strongly basic alkali metal compounds, at a temperature between 0° C. and 120° C.

6. Process for the preparation of a guanamine comprising reacting dicyandiamide with a substance chosen from the group consisting of lower alkyl aliphatic and aromatic hydrocarbon nitriles and dinitriles, the molecular ratio of dicyandiamide to said substance being between 1.05:1 and 1.25:1, in liquid ammonia in the presence of a catalyst chosen from the group consisting of alkali metals, alkaline earth metals, alkali metal hydroxides and amides and other strongly basic alkali metal compounds, at a temperature between 60° and 100° C.

7. Process for the preparation of a guanamine comprising reacting dicyandiamide with a substance chosen from the group consisting of lower alkyl aliphatic and aromatic hydrocarbon nitriles and dinitriles, the molecular ratio of dicyandiamide to said substance being between 1.05:1 and 1.25:1, in liquid ammonia in the presence of sodium hydroxide in an amount of between 4% and 8% of the weight of dicyandiamide, at a temperature betwen 0° C. and 120° C.

8. Process for the preparation of a guanamine comprising reacting dicyandiamide with a substance chosen from the group consisting of lower alkyl aliphatic and aromatic hydrocarbon nitriles and dinitriles, the molecular ratio of dicyandiamide to said substance being between 1.05:1 and 1.25:1, in liquid ammonia in the presence of sodium hydroxide in an amount of between 4% and 8% of the weight of dicyandiamide, at a temperature between 60° C. and 100° C.

References Cited in the file of this patent

UNITED STATES PATENTS

| | | |
|---|---|---|
| 2,161,940 | Widmer | June 13, 1939 |
| 2,191,361 | Widmer | Feb. 20, 1940 |
| 2,606,904 | Kaiser | Aug. 12, 1952 |
| 2,684,366 | Simons | July 20, 1954 |

FOREIGN PATENTS

| | | |
|---|---|---|
| 497,646 | Belgium | 1951 |

OTHER REFERENCES

P. B. No. 808 (1941), 3 pp. spec.